(12) United States Patent
Majumdar et al.

(10) Patent No.: US 8,842,670 B2
(45) Date of Patent: Sep. 23, 2014

(54) SCALING NUMBER OF VIRTUAL LINKS IN A FIBER CHANNEL FORWARDER DEVICE

(75) Inventors: Saugat Majumdar, San Jose, CA (US); Srinivas Pitta, Cupertino, CA (US); Giuseppe Andreello, Aubonne (CH); Kalyan Kumar Ghosh, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 403 days.

(21) Appl. No.: 13/028,671

(22) Filed: Feb. 16, 2011

(65) Prior Publication Data

US 2012/0155469 A1     Jun. 21, 2012

Related U.S. Application Data

(60) Provisional application No. 61/425,310, filed on Dec. 21, 2010.

(51) Int. Cl.
*H04L 12/28* (2006.01)
*H04L 12/931* (2013.01)
*H04L 12/721* (2013.01)

(52) U.S. Cl.
CPC .............. *H04L 45/26* (2013.01); *H04L 49/357* (2013.01); *H04L 49/70* (2013.01); *H04L 49/351* (2013.01)

USPC ........................................................... 370/392

(58) Field of Classification Search
CPC ...................................................... H04L 45/351
USPC .................... 370/389, 392, 401, 419
See application file for complete search history.

(56) References Cited

U.S. PATENT DOCUMENTS

| 7,460,527 | B2 | 12/2008 | Ghosh et al. |
| 7,484,021 | B2 | 1/2009 | Rastogi et al. |
| 8,369,347 | B2 * | 2/2013 | Xiong et al. ................... 370/401 |
| 2006/0092932 | A1 | 5/2006 | Ghosh et al. |
| 2009/0094354 | A1 * | 4/2009 | Rastogi et al. ................ 709/221 |
| 2010/0226281 | A1 | 9/2010 | Ghosh et al. |
| 2010/0290472 | A1 | 11/2010 | Raman et al. |

* cited by examiner

*Primary Examiner* — Dang Ton
*Assistant Examiner* — Nourali Mansoury
(74) *Attorney, Agent, or Firm* — Edell, Shapiro & Finnan, LLC

(57) ABSTRACT

At a network device that forwards packets between compute devices and virtual storage area networks using Fiber Channel over Ethernet techniques, data is stored for a virtual fabric port of the network device identifying each of a plurality of virtual storage area networks. For each virtual storage area network, data is stored identifying each of a plurality of compute devices that are logged into the virtual storage area network via the network device. The network device forwards packets sent to the virtual fabric port of the network device from the plurality of compute devices to corresponding ones of the plurality of virtual storage area networks.

20 Claims, 7 Drawing Sheets

US 8,842,670 B2

SCALING NUMBER OF VIRTUAL LINKS IN A FIBER CHANNEL FORWARDER DEVICE

CROSS REFERENCE TO RELATED APPLICATION

This application claims priority to U.S. Provisional Patent Application No. 61/425,310, filed Dec. 21, 2010, the entirety of which is incorporated herein by reference.

TECHNICAL FIELD

The present disclosure relates to Fiber Channel networks.

BACKGROUND

The Fiber Channel (FC) protocol has established itself in the storage industry as the best-performing and most reliable transport for block storage. This role is the result of years of innovation and tuning that have built a solid ecosystem of end-to-end services and tools to satisfy the storage needs of mission-critical applications.

When deploying networks with a large number of nodes that need to exchange data in a Fiber Channel network, the concept of "virtual links" has been developed to more efficiently satisfy the routing requirements in the network. However, there are challenges in accommodating scalability in the network devices that participate in routing of data in a Fiber Channel network.

DESCRIPTION OF EXAMPLE EMBODIMENTS

Overview

Figure 1:
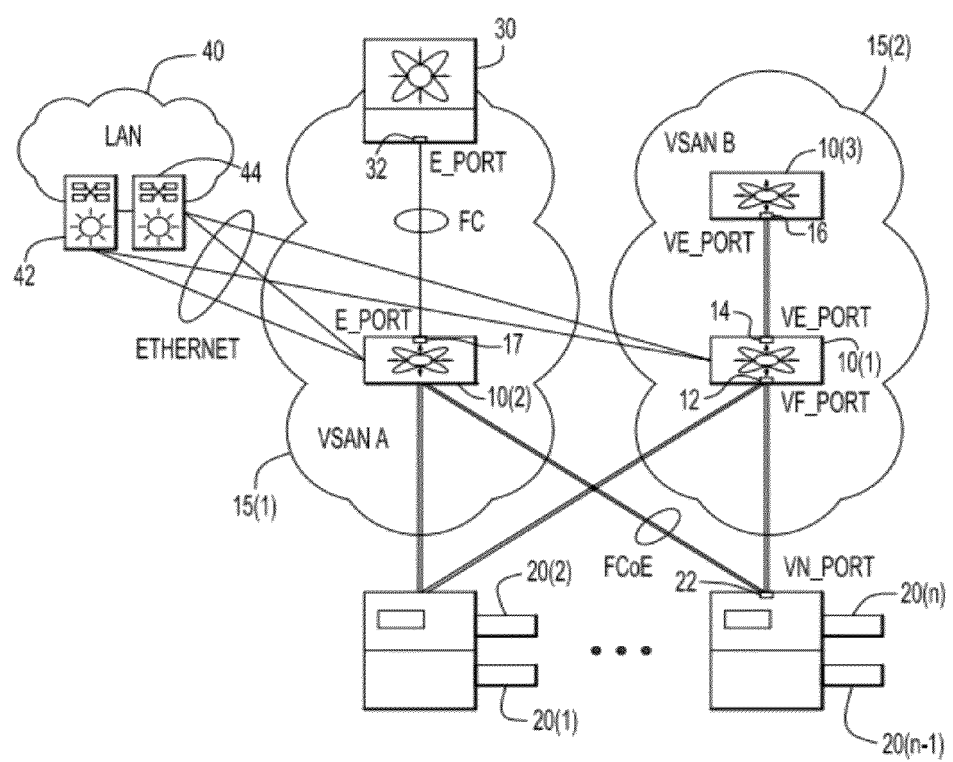
FIG. 1 is a block diagram showing an example of a Fiber Channel network deployment comprising a plurality of Enodes and a plurality of Fiber Channel Forwarder devices, where the Fiber Channel Forwarder devices scale the number of virtual links to accommodate login of multiple Enodes at a single Virtual Fabric port.

At a network device that forwards packets between compute devices and virtual storage area networks using Fiber Channel over Ethernet techniques, data is stored for a virtual fabric port of the network device identifying each of a plurality of virtual storage area networks. For each virtual storage area network, data is stored identifying each of a plurality of compute devices that are logged into the virtual storage area network via the network device. The network device forwards packets sent to the virtual fabric port of the network device from the plurality of compute devices to corresponding ones of the plurality of virtual storage area networks.

Example Embodiments

Fiber Channel over Ethernet (FCoE) offers the capability to transport FC payloads on top of an Ethernet network. FCoE originates from the simple observation that as long as the same ecosystem of end-to-end services and tools remains available, and as long as performance is not affected, users do not have a preference for a physical representation of data on a wire. By offering equivalent quality-of-service (QoS) semantics, and by presenting the same data-link-layer payloads to upper-layer services, an Ethernet link can effectively replace a FC link at the physical layer.

With FC frames carried on an Ethernet cable, the next step is to take these frames and mix them with regular Ethernet frames on the same wire. By enabling the same Ethernet link to carry both FC and Ethernet payloads, FCoE increases utilization of the physical infrastructure and therefore reduces the total number of network ports that exist overall. In this basic model, the FC physical layer is replaced by an Ethernet physical layer, FC and Ethernet frames share the same wire, and each switch forwards each individual frame from one ingress port to one egress port using the forwarding rules that are appropriate: FC rules (based on the T11 FC-Switch standard) for Fiber Channel frames, and Ethernet rules (based on the IEEE 802.1D standard) for Ethernet frames.

A one-to-one mapping between a FC link and an Ethernet link is a simple way to build an FCoE network that can potentially extend end-to-end, from initiators to targets, through a number of switching points. The switching points can perform switching with FC rules and can implement the entire stack of FC services (starting from FC-2). The fabric is an FC fabric that uses Ethernet to encode signals that are sent from one point to the next.

This simplicity is a strength of FCoE, but it limits end-to-end deployments to a class of devices that understand both the Ethernet and the FC stacks, known as dual-stack switches called FCoE forwarders (FCFs) in T11 parlance. From among the few ways to allow frames with different data-link-layer structures to coexist on the same transmission line, the T11 standard committee chose for FCoE the way that is least disruptive to the existing Ethernet definition: encapsulation. Encapsulating FC frames with an additional Ethernet header transforms the FC frame into a standard Ethernet frame and one that can potentially be forwarded by any standard Ethernet switching implementation. This property of encapsulation can be used to interleave dual-stack switches with regular Ethernet switches that appear as transparent points (FCoE passthrough switches) to the FC stack.

However, while FC protocols and FC switches are designed to deal with point-to-point connectivity, FCoE passthrough switches introduce shared-media (point-multipoint) semantics. In other words, an FCoE passthrough that is invisible to the Fiber Channel stack acts as a concentrator of flows from multiple servers into the same port of a dual-stack switch, and thus it creates a shared-medium hanging off the dual-stack switch port. A typical Fiber Channel stack is not prepared to address shared-media links, since they do not exist in native Fiber Channel; these new semantics therefore are handled by FCoE without affecting the Fiber Channel stack.

The solution in FCoE is the concept of virtual FC interfaces and the introduction of a small set of control plane functions to build so-called "virtual links" among pairs of virtual FC interfaces. Multiple virtual FC interfaces can be presented on the same physical Ethernet interface of a dual-stack switch. After the virtual links are established among pairs of virtual FC interfaces, the result is presented to the FC stack as a set of point-to-point connections that behave exactly like regular FC connections, regardless of the number of FCoE passthrough switches that are physically inserted between the actual FC endpoints. The FC Initiation Protocol (FIP) is the set of control plane functions that enable discovery of FCoE-capable devices across FCoE passthrough switches and establishment of legal combinations of virtual links. Both FCoE and FIP are described in T11 FC-BB-5 standard.

The FIP is a Layer-2 (L2) protocol for end point discovery and fabric association. The FIP has its own Ether Type and uses its own frame formats. There are two phases to FIP: discovery and login. Once the discovery of a compute device (referred to as an Enode as described hereinafter) and login are complete, FCoE traffic can start flowing between the endpoints. By snooping on FIP packets during the discovery and login phases, intermediate bridges can implement dynamic data integrity mechanisms that permit valid FCoE traffic between the Enode and the FCF. Implementing such security mechanisms ensures that only valid FCoE traffic is allowed. A bridge implementing the above functionality is referred to as an "FIP Snooping Bridge." An FIP Snooping Bridge is referred to hereinafter in connection with FIG. 6.

In the T11 FC-BB-5 standard, FCoE defines two types of endpoints for the Ethernet encapsulation of Fiber Channel frames: FCoE nodes (ENodes) and FCFs.

FCoE Architecture Model

FIG. 1 shows an example of an FCoE network 10 comprising a plurality of FCFs, e.g., FCFs 10(1), 10(2) and 10(3), in virtual storage area networks (VSANs) 15(1) and 15(2), denoted VSAN A and VSAN B, and a plurality of Enodes 20(1)-20(n). FIG. 1 also shows that a VSAN comprises FC switches, an example of which is shown at reference numeral 30 in VSAN 15(1). ENodes are the combination of FCoE termination functions and a FC stack on Converged Network Adapters (CNAs), and in that sense they are equivalent to Host Bus Adapters (HBAs) in native FC networks. Virtual machines (VMs) run on the Enodes and on the FCFs. Thus, the Enodes are essentially compute devices that run one or more VMs.

The FCFs 10(1), 10(2) and 10(3) are the combination of FCoE termination functions and an FC stack on Ethernet switches (dual-stack switches) and are therefore functionally equivalent to FC switches in native Fiber Channel networks.

Enodes present virtual FC interfaces in the form of Virtual Network (VN) Ports (VN_Ports), that can establish FCoE virtual links with Virtual Fabric (VF) Ports (VF_Ports) on FCFs. The FCFs present virtual FC interfaces in the forms of VF_Ports and Virtual Ethernet (VE) Ports (VE_Ports). A VF_Port establishes FCoE virtual links with a CNA's VN_Port, and VE_Ports enable an FCF to establish FCoE virtual links with another FCF. These interface types have their equivalents in native FC N_Ports, F_Ports, and E_Ports. For example, FCF 10(1) has a VF_Port 12 that interfaces with VN_Ports of Enodes, e.g., VN_Port 22, and has a VE_Port 14 that interfaces with a VE_Port 16 on FCF 10(3). FCF 10(2) has an E_Port 17 used for FC communication with an E_Port 32 of FC switch 30.

FCFs can also communicate over standard Ethernet networks. For example, FCFs 10(1) and 10(2) are shown connecting to a local area network (LAN) 40, and in particular, to switches 42 and 44 in the LAN 40.

FCoE virtual links replace the physical FC links by encapsulating FC frames in Ethernet frames, and an FCoE virtual link is identified by the medium access control (MAC) addresses of the two FCoE endpoints. The T11 FC-BB-5 FCoE standard mandates lossless characteristics for the Ethernet segments traversed by encapsulated FC frames, and although it does not specify the exact means to obtain such QoS, the IEEE 802.1 Data Center Bridging (DCB) protocol, and specifically IEEE 802.1Qbb, is used for this purpose on the Ethernet segments. In FIG. 1, the FCoE segments are indicated by double-lines and the Ethernet segments are indicated by a single line.

Communication from one endpoint to the other in an FCoE virtual link uses Ethernet forwarding semantics, augmented by IEEE 802.1 DCB functions. If no FCoE passthrough switches exist in the path between the two FCoE endpoints (FCoE direct attach), no Ethernet switching is required, but IEEE 802.1 DCB semantics still apply on the physical Ethernet link. Switching from ingress to egress virtual interface of an FCF requires Fiber Channel forwarding semantics.

An FC virtual link between two FCoE devices, A and B, is uniquely identified by the triplet:

[MAC address of FCoE device A, MAC address of FCoE device B, FCoE VLAN ID]

Given a physical Ethernet interface on an FCoE device (or, more accurately, what the FC-BB-5 standard calls an FCoE controller behind that interface), the FCoE device establishes all the virtual links for which that physical interface is configured. Typically, the configuration is represented in the form of one or more virtual FC interfaces (what the FC-BB-5 standard calls FCoE logical endpoints (FCoE-LEPs)) mapped on top of the physical Ethernet interface.

The information for the triplets that characterize the virtual links can be statically configured on the FCoE device, but the FC-BB-5 standard defines in the FIP to dynamically discover all the information required. In other words, for every virtual FC interface configured on top of a physical Ethernet interface, the FIP is responsible for discovering a pairing virtual FC interface somewhere else in the Ethernet network and establishing a virtual link between the two virtual interfaces in a specific FCoE VLAN.

FCoE VLANs

FCoE packets are exchanged in a VLAN. For FCFs with a FC stack that includes multi-VSAN capabilities like the Cisco Nexus 5000 Series, the FCoE traffic belonging to different VSANs remains separated by different VLANs on the Ethernet plane. This choice simplifies the implementation, since it removes the necessity to include both a VLAN and a VSAN header in each FCoE packet: the VLAN is assumed to be a proxy for a VSAN.

For this reason, the Cisco Nexus 5000 Series software introduced the concept of a mapping table between FCoE VLANs and FC VSANs. For each FC VSAN used in the FC fabric, the administrator associates one and only one unique FCoE VLAN; all FCoE packets tagged with that VLAN ID are then assumed for FC control plane and forwarding purposes to belong to the corresponding Fiber Channel VSAN.

Virtual links exist in one and only one FCoE VLAN. VSAN trunking capabilities (as defined in FC-SW-5, a standard for native Fiber Channel switching fabrics) are not explicitly described by FC-BB-5; however, equivalent semantics can be obtained by defining multiple virtual FC interfaces on the same physical interface: one per FCoE VLAN.

The FCoE Initialization Protocol

The FIP is the FCoE control protocol responsible for establishing and maintaining FC virtual links between pairs of FCoE devices (ENodes or FCFs). During the virtual link establishment phase, the FIP first discovers FCoE VLANs and remote virtual FC interfaces; then it performs virtual link initialization functions including fabric login (FLOGI) and fabric discovery (FDISC), as well as exchange link parameters (ELP) similar to their native Fiber Channel equivalents.

After the virtual link is established, Fiber Channel payloads can be exchanged on the virtual link, and the FIP remains in the background to perform virtual link maintenance functions; it continuously verifies reachability between the two virtual FC interfaces on the Ethernet network, and it offers primitives to delete the virtual link in response to administrative actions to that effect.

The FIP is useful to establish virtual FC links between VN_Ports and VF_Ports (ENode to FCF), as well as between pairs of VE_Ports (FCF to FCF), since these are the only legal combinations supported by native Fiber Channel fabrics.

According to Section 7 of the FC-BB-05 Standard, a virtual link can exist between a VF_Port of a FCF and the VN_Port of the Enode. The standard mentions that a VF_Port is instantiated in the FCF upon successful completion of a FIP FLOGI Exchange initiated by an Enode. Thus, according to the standard a virtual link between VN_Ports and a VF_Ports only exist if all the VN_Ports have the same MAC address. Thus, only one Enode can have links with a VF_Port.

There are several disadvantages with this approach. From a scalability perspective, the number of VF_Ports increases linearly with the number of successful completions of a FLOGI exchange initiated by different Enode MAC addresses. The current method is not scalable for the following reasons. For every Enode, it is necessary to allocate separate resources for the instantiation of the VF_Port. In a large network, this will incur a high cost to support VF to VN links for the large number of Enodes. For example, each VF_Port is allocated a range of Fiber Channel Identifiers (FCIDs) from which FCIDs will be assigned to the connecting Enodes and the VMs. With the increase in the number of VF_Ports, it is possible to run out of FCID ranges to be allocated to new VF_Ports. In software, more VF_Ports will add higher cost and impact memory management.

From a management cost perspective, if a different VF_Port is used for each Enode then the network administrator needs to monitor the configuration of a different VF_Port for every Enode. The cost of monitoring increases with the number of connecting Enodes. Accordingly, techniques are provided herein to achieve scalability of the number of virtual links that can exist in an FCF so that an FCF can support a larger number of links per VSAN. Thus, one or more of the FCFs 10(1)-10(3) scale the number of virtual links to accommodate the login of multiple Enodes at a single VF_Port.

Figure 2:
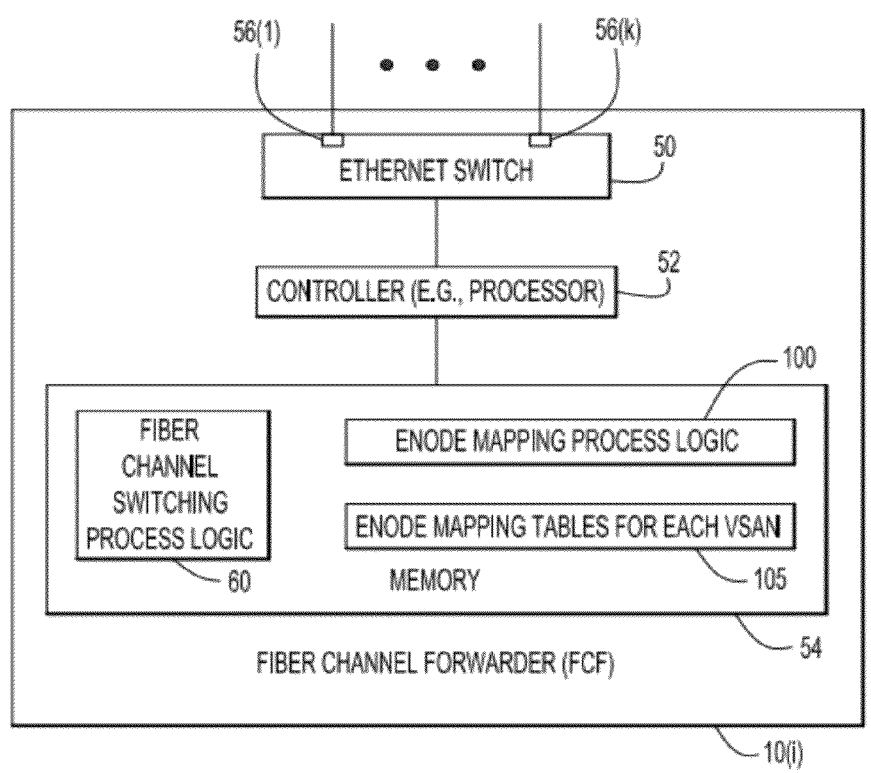
FIG. 2 is an example block diagram of a Fiber Channel Forwarder device that scales the number of virtual links to accommodate login of multiple Enodes at a single Virtual Fabric port.

Turning now to FIG. 2, an example block diagram of an FCF 10(i), i.e., any of the FCFs 10(1)-10(3) shown in FIG. 1, is now described. The FCF comprises an Ethernet switch 50, a controller 52 and memory 54. The Ethernet switch 50 performs Ethernet switch and routing functions for the FCF. The Ethernet switch 50 may be implemented with one or more application specific integrated circuits (ASICs) that support communication over one or more physical ports shown at 56(1)-56(k). The controller 52 is a microprocessor or microcontroller that executes instructions store in memory 54. The memory 54 is a memory device that may comprise read only memory (ROM), random access memory (RAM), magnetic disk storage media devices, optical storage media devices, flash memory devices, electrical, optical, or other physical/tangible memory storage devices. The controller 52 executes instructions for Fiber Channel switching process logic 60. Thus, the FC switching functions are performed by software in the FCF 10(i). The controller 52 also executes instructions for the Enode mapping process logic 100 stored in memory 56. Thus, in general, the memory 56 may comprise one or more computer readable storage media (e.g., a memory device) encoded with software comprising computer executable instructions and when the software is executed (by the controller 52) it is operable to perform the operations described herein in connection with process logic 100. The memory 56 also stores data 105 representing Enode mapping tables for each VSAN. Examples of the mapping tables are described hereinafter in conjunction with FIG. 3. The Enode mapping process logic 100 may be included as part of the Fiber Channel switching process logic 60.

The FCF 10(i) supports many-to-many mappings, at one VF_Port, of Enodes and VSANs. Virtual links co-exist between a VF_Port and VN_Ports of Enodes with different MAC addresses. Consequently, FCF 10(i) achieves an aggregation of Enodes under a single VF_Port. This leads to better utilization of resources and thus helps to scale the number of links that can exist in a given FCF. A VF_Port is a software-created construct that is associated with packets received by the FCF at the Ethernet switch 50. An FCF may support multiple VF_Ports.

To this end, a virtual link is represented by the tuple <VF_Port PWWN, VN_Port PWWN, Enode MAC address>, where "PWWN" represents the Port World Wide Name of the VF_Port or VN_Port. However, the link can be defined using other unique values for both ends of the link. Also, any Enode can establish multiple links with the same VF_Port so that there is a many-to-many mapping from the set of Enodes to the set of FCFs in a network, whereas existing standards only allow one-to-many mapping from the set of Enodes to the set of FCFs in a network.

Figure 3:
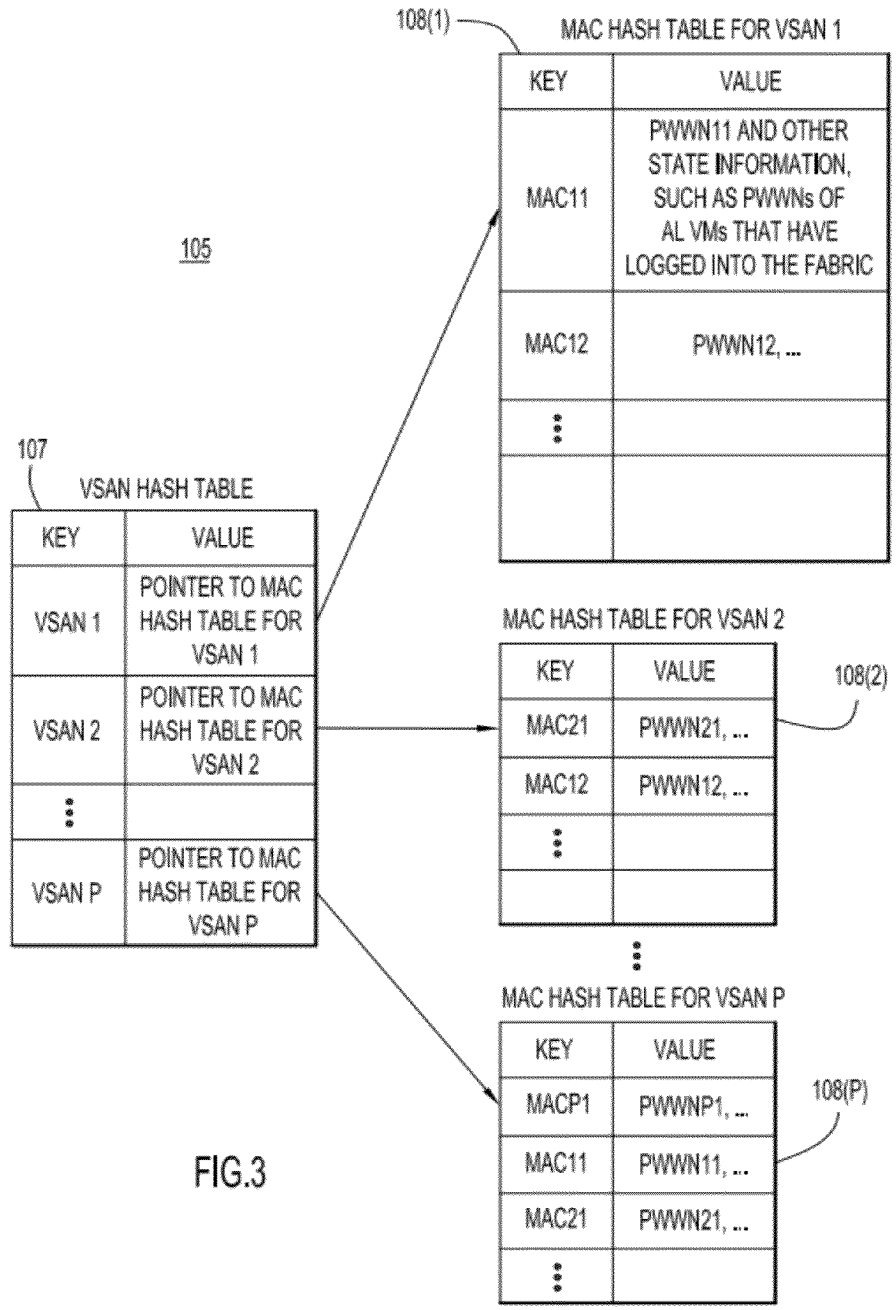
FIG. 3 is a diagram showing data structures stored at the Fiber Channel Forwarder device when an Enode logs in at a Virtual Fabric port on the Fiber Channel Forwarder.

Referring now to FIG. 3, the mapping tables 105 stored in the FCF are now described. For each VF_Port of the FCF, the FCF stores a VSAN Hash Table 107 that is indexed by VSAN identifier, and the VSAN Hash Table 107 comprises respective pointer values that point to one of a plurality of MAC Hash Tables 108(1)-180(P) for a corresponding one of a plurality of VSANs VSAN1-VSANP. For example, as shown in FIG. 3, there are VSANs 1-P, and there is a MAC Hash Table for each of these VSANs, such that MAC Hash Table 108(1) is for VSAN 1, MAC Hash Table 108(2) is for VSAN 2, and so on. The FCF maintains a table for its VF_Port that is indexed by the VSAN. Each MAC Hash Table is indexed by MAC addresses which correspond to the MAC addresses of the Enodes that are logged in to a corresponding VSAN via the FCF. Each entry in the MAC Hash Table stores information about the VF-VN links that exist between the Enode and the FCF for a given VSAN. Thus, as depicted in FIG. 3, the FCF stores data comprising identifiers for corresponding ones of a plurality of VSANs, and for each of the VSANs, data comprising identifiers for compute devices that have logged into the VSAN. In one form, the identifiers of compute devices that are logged into a VSAN comprise a MAC address for each compute device, that is stored together with data identifying the VF_Port, e.g., PWWN of the VF_Port, and data identifying a VN_Port of the compute device, e.g., PWWN of the VN_Port. In general, the information stored in an entry of the MAC Hash Table for a given VSAN indicates the PWWN of all of the virtual machines that are logged into the fabric for that Enode.

Figure 4:
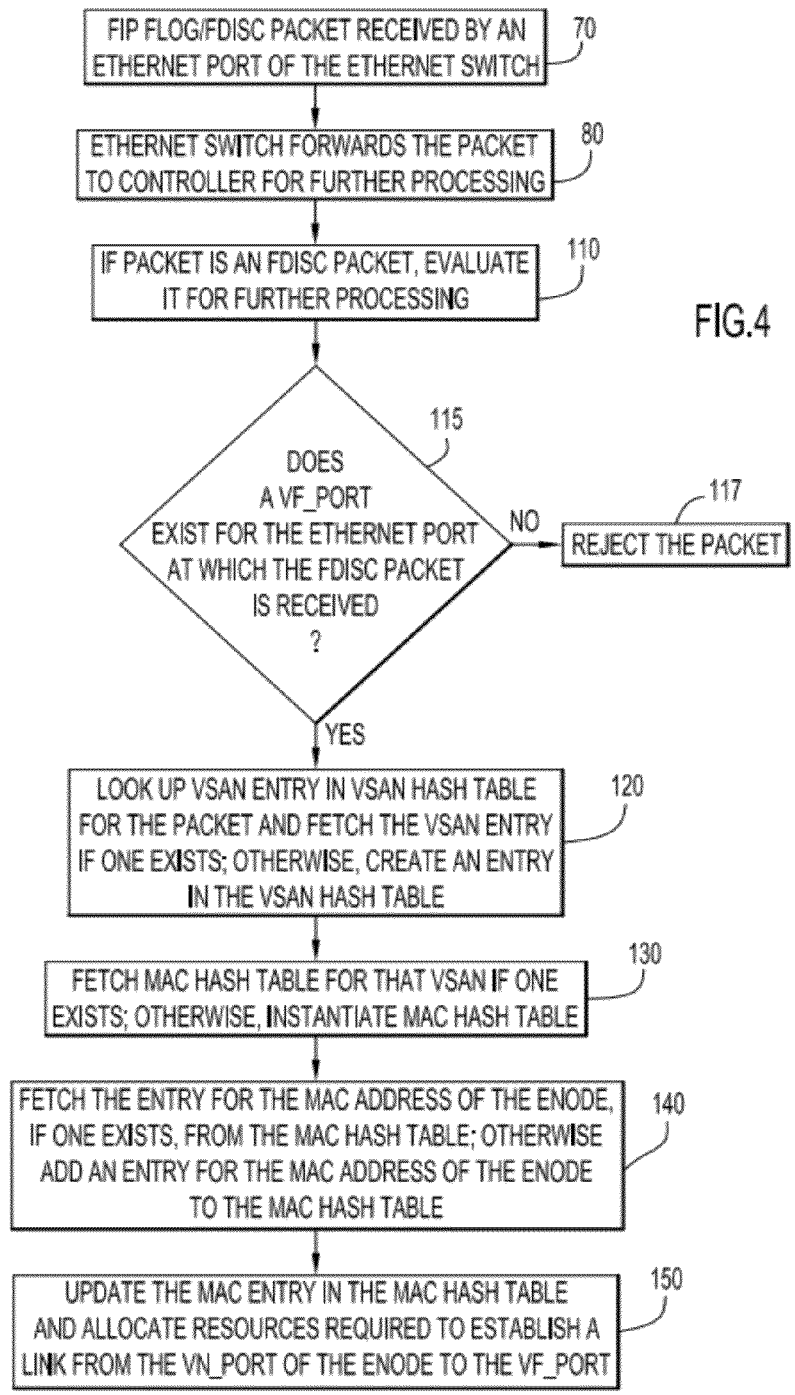
FIG. 4 is a flow chart showing operations in the Fiber Channel Forwarder device to accommodate scalability of the number of virtual links.

Reference is now made to FIG. 4, together with FIG. 3, for a description of the processing of a received packet at an FCF according to the techniques described. Operations 70 and 80 are associated with the reception of a packet at an FCF and not operations of process logic 100 per se. Operations 110-150 are operations of the process logic 100. At 70, a packet is received by the FCF from an Enode. For example, the packet is received at an Ethernet port of the Ethernet switch of the FCF. At 80, the packet is forwarded for processing by software executed by the controller 52.

At 110, if the packet is a fabric discovery (FDISC packet), it is evaluated to determine how to handle it for further processing. First, at 115, it is determined whether there is a VF_Port already created for the source Ethernet port of the Ethernet switch at which the FDISC packet is received. The FDISC packet is rejected as indicated at 117 if no VP_Port exists for the Ethernet port at which the FDISC packet is received. On the other hand, if a VF_Port exists for the Ethernet port at which the FDISC packet is received, then the several operations are performed. Thus, the controller 52 has to first instantiated a VF_Port for one or more of the Ethernet ports of the Ethernet switch of the FCF before FDISC packets received at an Ethernet port can be processed.

At 120, the VSAN Hash Table 107 is accessed to look up whether there is a VSAN entry in VSAN Hash Table 107 for the FDISC packet (based on the VSAN indicated in the FDISC packet) and if one exists, then that VSAN entry is fetched. If a VSAN entry does not already exist, then an entry is created in the VSAN Hash Table 107 for that entry. For example, if the FDISC packet indicates VSAN 1, then a corresponding value in the VSAN Hash Table 107 is fetched in order to access the corresponding MAC Hash Table for that VSAN. If the FDISC packet indicates VSAN 3 and there is no VSAN3 stored in the VSAN Hash Table 107, then an entry is instantiated in the VSAN Hash Table 107 for VSAN 3.

At 130, the MAC Hash Table for the VSAN is fetched, if one exists; otherwise, a MAC Hash Table is created for that VSAN. For example, if the FDISC packet indicates VSAN 1, then the MAC Hash Table 108(1) is retrieved. However, if the FDISC packet indicated VSAN 3 and there is no entry in VSAN Hash Table 107 for VSAN 3, then a MAC Hash Table is created for VSAN 3.

At 140, the entry for the MAC address of the Enode, if one exists, is fetched from the MAC Hash Table (fetched or created at 130); otherwise an entry for the MAC address of the Enode is added to the MAC Hash Table.

Operations 120-140 thus involve evaluating information contained in a received discovery packet with respect to the mapping data 105 stored at the network device to determine whether a particular compute device that sent the discovery packet has already logged into one of the VSANs. The evaluation operations involve evaluating, with respect to the stored data, an identifier of a VSAN and a MAC address for the particular compute device, which are contained in the discovery message. When an entry for the particular compute device does not exist in the data comprising identifiers of compute devices that have logged into the VSAN (e.g., in a MAC Hash Table) that is identified by the discovery packet, then an entry for the particular compute device is added to that data.

At 150, the MAC entry in the MAC Hash table is updated and resources required to establish a link from the VN_Port of the Enode to this VF_Port are allocated in the FCF **10(*i*)**. Allocation of resources involves assigning an N_Port_id to the PWWN of the Enode that is trying to login to the given VSAN. Hardware tables such as routing tables and Access Control Lists (ACLs) are updated with the N_Port_id, PWWN, VSAN-id and other information about the login. The name server database is also updated across the fabric with the information about this new device that has logged in to the VSAN.

The FCF **10(*i*) accepts multiple FLOGIs and FDISCs from Enodes with different MAC addresses from a VF_Port and from different VSANs from a VF_Port. The FCF maintains stateful information for all the Enodes that are logged in for a VSAN. In addition, the FCF 10(*i*)** is configured so that a VF_Port on it can be a member of different VSANs, thus achieving VSAN trunking of virtual links between the VF_Port of the FCF and the VN_Port of the Enode. The Enode does a login into every operational VSAN of which the VF_Port is a member. Thus, an Enode can be part of multiple VSANs in the fabric. This allows more links to be provided at an FCF. Existing solutions do not allow VSAN trunking of these links and as a result an Enode can only be part of one VSAN in the fabric, thus not scaling with the number of links per VSAN.

There are several advantages to the solution described herein. First, this solution enables scaling of the number of links that can exist in a FCF. Enodes can login into multiple VSANs, and do not need to be connected directly to the FCF, i.e., they can connect to a cloud in which the FCF resides and connect to the FCF through an intervening network device as described hereinafter in connection with FIG. 6. The approach described herein provides for better utilization of the FCID ranges. Also, fewer VF_Ports need to be implemented, thus reducing memory and CPU cost requirements for an FCF.

Figure 5:
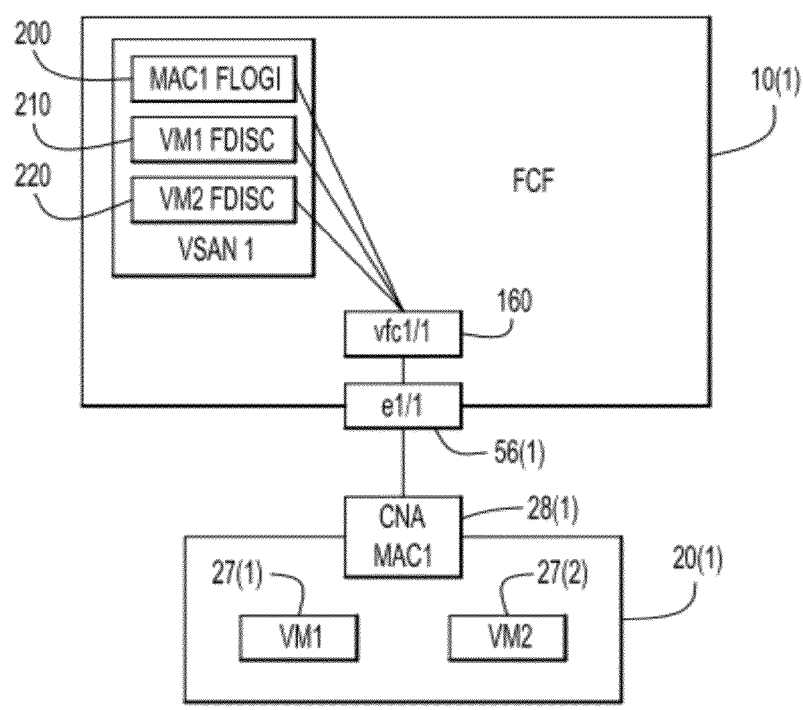
FIGS. 5 and 6 are diagrams showing use case examples for the techniques described herein.

Referring now to FIG. 5, a first use case is described. In this use case, an FCF 10(1) is directly connected to an Nport ID Virtualization (NPIV) Enode 20(1) that runs VMs VM1 and VM2 shown at reference numerals 27(1) and 27(2). Thus, the FCF is in NPIV mode. The NPIV mode allows the connecting device to run virtual machines that can also login to the fabric. The host sends a FLOGI and the virtual machines login by sending FDISC packets. The Non-NPIV mode is a simple case where only a FLOGI is sent. The Enode 20(1) has MAC address MAC1 on a CNA shown at 28(1). At the FCF 10(1), an Ethernet port e1/1 shown at 56(1) and the controller of the FCF 10(1) generates a virtual FC (vfc) port vfc1 shown at 160 that is mapped to the Ethernet port e1/1. In this example, vfc1/1 is a member of VSAN 1.

The Enode 20(1) logs into the fabric using a FIP-FLOGI packet shown at 200. The FCF 20(1) maintains the FIP-FLOGI session in a vfc-VSAN context and creates a vfc-VSAN-MAC context (vfc1/1, VSAN 1, MAC1) for Enode 20(1). VM1 of Enode 20(1) logs into the fabric using a FDISC packet shown at 210. The FCF 10(1) creates data structures in the (vfc1/1, VSAN 1, MAC1) context for the FIP-FDISC packet 210. VM2 of Enode 20(2) logs into the fabric using a FDISC packet shown at 220.

Figure 6:
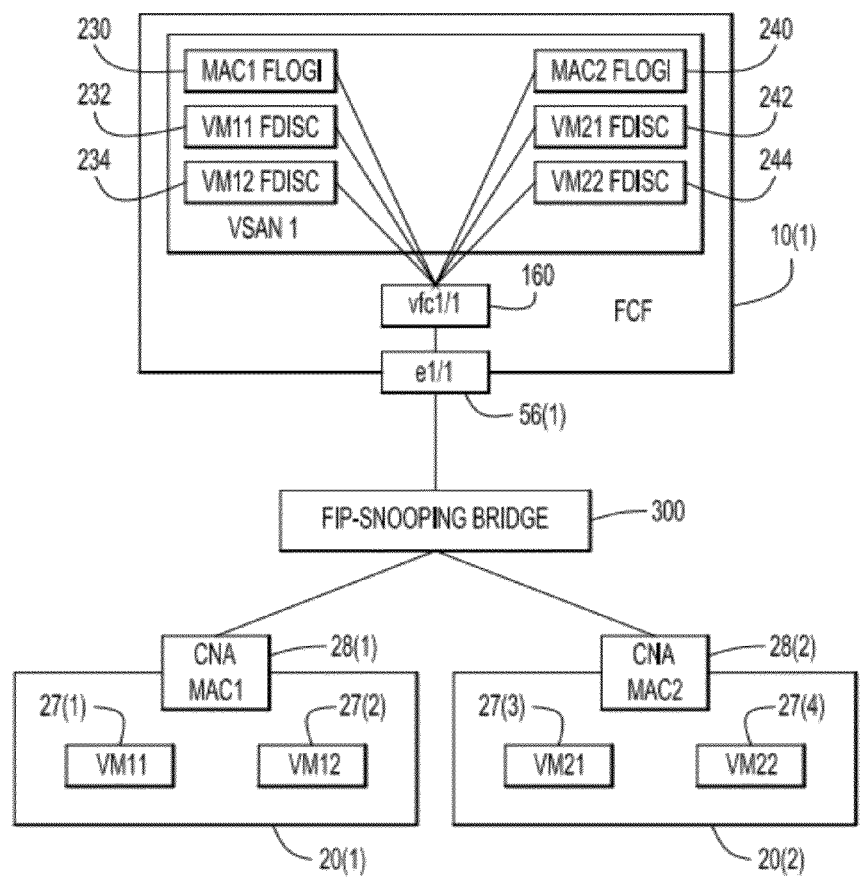

Turning to FIG. 6, another use case is described. In this use case, the FCF 10(1) is connected to multiple NPIV Enodes 20(1) and 20(2) through a FIP Snooping Bridge 300. Enode 20(1) runs VMs VM11 and VM12 shown at 27(1) and 27(2) and has MAC address MAC1 shown at 28(1). Enode 20(2) runs VMs VM21 and VM22 shown at 27(3) and 27(4) and has MAC address MAC2 shown at reference numeral 28(2).

Enode 20(1) logs into the fabric by sending a FLOGI packet shown at 230. The FCF 10(1) accepts the packet and then creates a vfc-VSAN-MAC context for Enode 20(1). Next, when the FCF 10(1) accepts a FIP-FDISC packet 232 from VM11, it adds a data structure for it with the context (vfc1/1, VSAN 1, MAC1). Similarly, the FCF 10(1) adds a data structure for the context (vfc1/1, VSAN 1, MAC1) for a FDISC packet 234 received from VM12.

The FCF 10(1) creates a context (host2, VSAN 1, MAC2) after accepting the FLOGI packet 240 from Enode 20(2). When the FCF 10(1) accepts an FDISC packet 242 from VM21, it adds a data structure with the context (vfc1/1, VSAN 1, MAC2). Likewise, the FCF 10(1) adds a data structure with the context (vfc1/1, VSAN 1, MAC2) for FDISC packet 244 from VM22.

In the use case of FIG. 6, Enodes are aggregated under the FIP Snooping Bridge 300. The FLOGI sessions are maintained at the FCF 10(1). There can be multiple hops of intervening FC devices, e.g., FIP Snooping Bridges, between the Enodes and the FCF 10(1) even though only one is shown in FIG. 6. The FCF 10(1) maintains a plurality of FLOGI sessions per (VSAN, vfc) context. This reduces the need to have FCF switches at the FC network edge and can be replaced with lower cost FIP-Snooping Bridges, thereby reducing the cost of network deployment.

Each FCF is initialized with a range of FCIDs that are uniquely allocated to the Enodes and the VMs. The ranges are allocated at a vfc-VSAN context per FCF device. Aggregation of multiple Enodes under a particular vfc allows for better utilization of the FCIDs and prevents faster exhaustion of the range. For large networks, managing multiple FCFs can be challenging. The approach disclosed herein of aggregating the Enodes using an FIP Snooping Bridge reduces the number of FCFs, making network configuration and maintenance easier.

Figure 7:
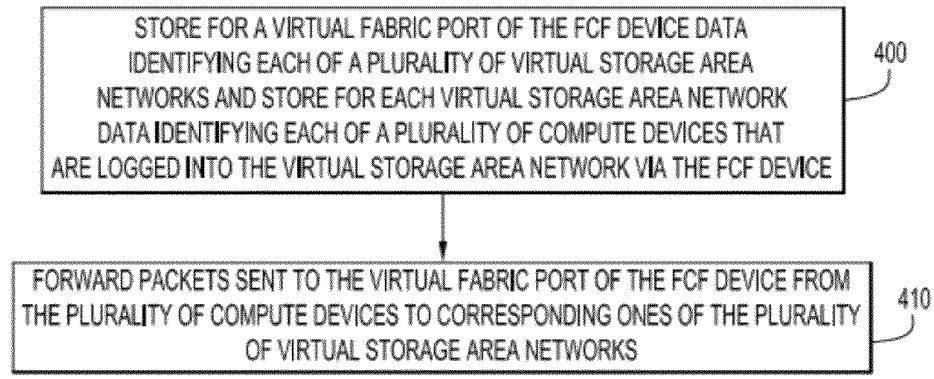
FIG. 7 is a flow depicting summarizing the operations of the Fiber Channel Forwarder device to support multiple logins at a Virtual Fabric port.

Turning now to FIG. 7, a flow chart is described that depicts the operations of an FCF that accommodates traffic sent to a single VF_Port from multiple Enodes to enable the multiple Enodes to access corresponding VSANs via a single VF_Port of the FCF. At 410, at a network device (e.g., FCF) that forwards packets between compute devices and virtual storage area networks using FCoE techniques, data is stored for a (single) VF_Port of the network device data identifying each of a plurality of virtual storage area networks and storing for each virtual storage area network data identifying each of a plurality of compute devices that are logged into the virtual storage area network via the network device. Similar data is separately stored for each VF_Port at the network device. At 420, the network device forwards packets sent to the VF_Port of the network device from the plurality of compute devices to corresponding ones of the plurality of virtual storage area networks. The stored data may comprise data indicating that any compute device has logged into two or more VSANs. Consequently, multiple compute devices can access multiple storage area networks via a single VF_Port of the network device.

According to the foregoing, an FCF is provided that supports many-to-many mappings at one VF_Port between devices that execute one or more VMs. Virtual links co-exist between a VF_Port and VN_Ports of Enodes with different MAC addresses. Consequently, the FCF aggregates Enodes under a single VF_Port. This leads to better utilization of resources and thus helps to scale the number of links that can exist in a given FCF.

In summary, a method is provided comprising: at a network device that forwards packets between compute devices and virtual storage area networks using Fiber Channel over Ethernet techniques, storing for a virtual fabric port of the network device data identifying each of a plurality of virtual storage area networks and storing for each virtual storage area network data identifying each of a plurality of compute devices that are logged into the virtual storage area network via the network device; and forwarding packets sent to the virtual fabric port of the network device from the plurality of compute devices to corresponding ones of the plurality of virtual storage area networks.

Similarly, an apparatus is provided comprising an Ethernet switch unit configured for communication over a network; and a controller configured to: store in a memory for a virtual fabric port associated with a port of the Ethernet switch unit data identifying each of a plurality of virtual storage area networks and for each virtual storage area network data identifying each of a plurality of compute devices that are logged into the virtual storage area network; and forward packets sent to the virtual fabric port from the plurality of compute devices to corresponding ones of the plurality of virtual storage area networks.

Further still, provided herein are one or more computer readable storage media encoded with software comprising computer executable instructions and when the software is executed operable to: store for a virtual fabric port of the network device data identifying each of a plurality of virtual storage area networks and store for each virtual storage area network data identifying each of a plurality of compute devices that are logged into the virtual storage area network via the network device; and forward packets sent to the virtual fabric port of the network device from the plurality of compute devices to corresponding ones of the plurality of virtual storage area networks.

The above description is intended by way of example only.

What is claimed is:

1. A method comprising:
at a network device that forwards packets between compute devices and virtual storage area networks using Fiber Channel over Ethernet techniques, storing, for a virtual fabric port of the network device, first mapping data that contains identifiers identifying each of a plurality of virtual storage area networks associated with the virtual fabric port;
storing, for each virtual storage area network, second mapping data that contains a plurality of medium access control addresses identifying each of a plurality of compute devices that are logged into the virtual storage area network via the network device, and wherein each entry in the first mapping data is linked to data in the second mapping data; and
forwarding the packets sent to the virtual fabric port of the network device from the plurality of compute devices, based at least in part upon the first mapping data and the second mapping data to corresponding ones of the plurality of virtual storage area networks.

2. The method of claim 1, and further comprising:
at the network device, receiving a discovery packet from a particular compute device; and
evaluating the discovery packet with respect to the first mapping data and second mapping data at the network device to determine whether the particular compute device has already logged into one of the plurality of virtual storage area networks.

3. The method of claim 2, wherein storing the second mapping data further comprises:
for each stored medium access control address, storing data identifying the virtual fabric port and corresponding data identifying a virtual network port of each of the compute devices.

4. The method of claim 3, comprising establishing a virtual link from the virtual network port of each of the compute devices to a virtual fabric port.

5. The method of claim 3, wherein the evaluating comprises evaluating, with respect to the first mapping data and second mapping data, an identifier of a virtual storage area network and a medium access control address for the particular compute device contained in the discovery packet.

6. The method of claim 5, and further comprising adding an entry for the particular compute device to the second mapping data based on the discovery packet.

7. The method of claim 2, wherein the receiving comprises receiving fabric discovery packets from the compute devices via one or more intervening Fiber Channel devices.

8. The method of claim 1, wherein storing the second mapping data comprises storing data indicating that a compute device has logged into two or more virtual storage area networks.

9. An apparatus comprising:
an Ethernet switch unit configured for communication over a network; and
a controller configured to:
store, in a memory for a virtual fabric port associated with a port of the Ethernet switch unit, first mapping data that contains identifiers identifying each of a plurality of virtual storage area networks associated with the virtual fabric port;
for each virtual storage area network, store second mapping data that contains a plurality of medium access control addresses identifying each of a plurality of compute devices that are logged into the virtual storage area network, and wherein each entry in the first mapping data is linked to data in the second mapping data; and
forward packets sent to the virtual fabric port from the plurality of compute devices, based at least in part upon the first mapping data and the second mapping data, to corresponding ones of the plurality of virtual storage area networks.

10. The apparatus of claim 9, wherein the controller is configured to evaluate a discovery packet from a particular compute device to determine whether the particular compute device has already logged into one of the plurality of virtual storage area networks.

11. The apparatus of claim 10, wherein the controller is configured to, for each stored medium access control address, store data identifying the virtual fabric port and corresponding data identifying a virtual network port of each of the compute devices.

12. The apparatus of claim 11, wherein the controller is further configured to establish a virtual link from the virtual network port of each of the compute devices to a virtual fabric port.

13. The apparatus of claim 11, wherein the controller is configured to evaluate an identifier of a virtual storage area network and a medium access control address for the particular compute device contained in the discovery packet with respect to the first mapping data and second mapping data.

14. The apparatus of claim 13, wherein the controller is configured to add an entry for the particular compute device to the second mapping data based on the discovery packet.

15. One or more non-transitory computer readable storage media encoded with software comprising computer executable instructions and when the software is executed operable to:
store for a virtual fabric port of a network device, first mapping data that contains identifiers identifying each of a plurality of virtual storage area networks associated with the virtual fabric port;
for each virtual storage area network, second mapping data that contains a plurality of medium access control addresses identifying each of a plurality of compute devices that are logged into the virtual storage area network via the network device, and wherein each entry in the first mapping data is linked to data in the second mapping data; and
forward packets sent to the virtual fabric port of the network device from the plurality of compute devices, based at least in part upon the first mapping data and the second mapping data, to corresponding ones of the plurality of virtual storage area networks.

16. The computer readable storage media of claim 15, and further comprising instructions that are operable to evaluate a discovery packet from a particular compute device with respect to the first mapping data and second mapping data to determine whether the particular compute device has already logged into one of the plurality of virtual storage area networks.

17. The computer readable storage medium of claim 16, and further comprising instructions that are operable to store, for each stored medium access control address, data identifying the virtual fabric port and corresponding data identifying a virtual network port of each of the compute devices.

18. The computer readable storage medium of claim 17, and further comprising instructions that are operable to establish a virtual link from the virtual network port of each of the compute devices to a virtual fabric port.

19. The computer readable storage medium of claim 17, wherein the instructions that are operable to evaluate comprise instructions that are operable to evaluate, with respect to the first mapping data and second mapping data, an identifier of a virtual storage area network and a medium access control address for the particular compute device contained in the discovery packet.

20. The computer readable storage medium of claim 19, and further comprising instructions that are operable to add an entry for the particular compute device to the second mapping data based on the discovery packet.

* * * * *